Reissued July 30, 1940

Re. 21,520

UNITED STATES PATENT OFFICE 21,520

HARD METAL ALLOY, ESPECIALLY FOR TOOLS

Paul Schwarzkopf, New York, N. Y., assignor to The American Cutting Alloys, Inc., New York, N. Y., a corporation of Delaware No Drawing. Original No. 2,122,157, dated June 28, 1938, Serial No. 743,717, September 12, 1934. Application for reissue February 28, 1940, Serial No. 321,281

18 Claims. (Cl. 75—136)

This invention relates to a hard metal alloy, especially but not exclusively for tools and other working appliances.

This application forms a continuation in part of my copending application Ser. No. 727,781, filed May 26, 1934, which in turn was copending with my application Ser. No. 625,042, filed July 27, 1932 and issued into Patent No. 2,091,017, which in turn was copending with my applications Ser. No. 656,103, filed February 10, 1933 and issued into Patent No. 1,959,879, and Ser. No. 452,132, filed May 13, 1930.

It is an object of the invention to increase the hardness and toughness of such hard metal alloys.

It is another object of the invention to make such hard metal alloys applicable to uses both known so far and new ones.

It is another object of the invention to increase the resistance of such hard metal tool alloys against mechanical wear and chemical effects, such as oxidation, of the surrounding air or moisture, or a cooling liquid, such as water.

It is a further object of the invention to increase the hardness of the alloy without impairing its toughness and the size of particles contained therein.

It is still another object of the invention to increase the speed at which hard alloys of this kind can be used for cutting, drilling, milling, and other machining purposes.

These and other objects of the invention will be more clearly understood as the specification proceeds.

According to the prior art, hard metal alloys had to be made and stored in different grades depending upon the intended use. So, for instance, a certain grade was usable for machining steel, another grade for working semi-steel and a third grade for machining cast iron. Within the grades themselves differentiations have been established depending upon the composition of the material to be worked. The grades usable for working steel or cast iron could not be used for successfully working glass, or artificial resins, and the great number of grades made the proper and simple handling of them in the manufacture as well as in the distribution very difficult.

According to the invention, a hard metal alloy can be obtained being usable for several purposes. So, for instance, the same hard metal alloy can be used for machining steel and cast iron.

In my Patent 1,959,879 I suggested a method of manufacturing a hard metal alloy containing mixed crystals, i. e. solid solutions of two or more carbides of elements selected from the third, fourth, fifth, and sixth group of the periodical system, cemented by lower melting auxiliary metal substantially taken from the iron group, and I do not claim that process in the present application.

The present invention concerns a hard composition for tool elements and other working appliances consisting substantially of three or more hard and refractory carbides of different elements selected from the third, fourth, fifth, and sixth group of the periodical system and auxiliary metal substantially of the eight group of the periodical system in amounts from about 3% to 25% by weight and wherein substantial amounts of said carbides form mixed crystals, i. e. crystalline solid solutions or homogeneous carbide crystal structures each of which contains atoms of different selected elements besides, of course, atoms of carbon necessary to form carbide with those selected elements.

As is well known in the art and established by experiments and science, solid solutions of two or more substances result in a compound the hardness of which exceeds that of either component substance. Therefore, the present invention consists particularly in a hard composition for the uses pointed out above, composed substantially of three or more hard and refractory carbides of different elements selected from the third through sixth group of the periodical system and auxiliary metal substantially of the eighth group of the periodical system, preferably of the iron group, in amounts from about 3% to 25% by weight, in which at least a substantial amount of the carbides are compounded to form mixed crystals or homogeneous carbide crystal structures as defined above, i. e. solid solutions the hardness of which exceeds that of either carbide combined in the solid solutions or homogeneous carbide crystal structures.

Although it is possible to manufacture a hard composition according to the invention in a process as disclosed and claimed in my Patent 1,959,879, it has been experienced that it is sometimes difficult to compound three or more carbides into solid solutions in substantial amount and to secure uniform distribution of all constituent carbides throughout the body of the composition.

According to a feature of this invention one can successfully proceed in manufacturing such mixed crystals or solid solutions by first forming at least two pairs of solid solutions, each consisting of two selected carbides, and thereafter combining those pairs of different compositions as to carbides contained, into a new mixed crystal. Taking for instance a mixed crystal consisting of tungsten carbide and molybdenum carbide, and another mixed crystal consisting of molybdenum carbide and titanium carbide, and combining them to form a new mixed crystal, it will contain the three components tungsten carbide, molybdenum carbide, and titanium carbide, and thereby two "binary" mixed crystals have been transformed into a "ternary" mixed crystal. In the same way a binary mixed crystal consisting of tungsten carbide and tantalum carbide, and another binary mixed crystal consisting of molybdenum carbide and titanium carbide, can be combined to a single mixed crystal which contains, however, four components, namely tungsten carbide, tantalum carbide, molybdenum carbide, and titanium carbide, and forms a "quaternary" mixed crystal. The mixed crystals so obtained may then be powdered to any desired degree and mixed with one or more auxiliary metals as for instance cobalt, iron, nickel. The mixture so obtained is then heated till at least part of the auxiliary metal is molten whereby sometimes part of the mixed crystals may be dissolved in the auxiliary metal. Thereupon the mixture is cooled. During cooling some or any one of the mixed crystals dissolved in the melt of the auxiliary metal is precipitated again. In any case, a solid and dense body results. Any known method of manufacturing and shaping such hard metal alloy bodies may be applied. Care is to be taken that the structure of the mixed crystals is substantially maintained or, if any dissolution takes place during heating, a substantial precipitation of the dissolved mixed crystals takes place during cooling. At all events, the amount of mixed crystals added to the mixture before heating must be sufficient in order to secure the wanted amount of mixed crystals in the solidified body after cooling. The amount of carbide being known which may be dissolved, if at all, in a certain quantity of auxiliary metal present, if being heated to a certain temperature and that temperature being maintained for a certain time, also the percentage being known of mixed crystals dissolved which will be precipitated again during cooling of the auxiliary metal forming the solvent for the mixed crystal, it is easy for any one skilled in the art, to determine in advance the amount of mixed crystals to be formed and added to a hard metal mixture according to the invention for securing quantitatively and qualitatively the amount and composition of mixed crystals present in the finished body. So, for instance, if knowing the mixed crystals used are soluble in an auxiliary metal present at the temperature of sintering, one may add to the mixture a surplus of such mixed crystals to such extent that the surplus covers the exact amount of mixed crystals dissolved in the heated auxiliary metal and not being precipitated again while cooling. Or, by using certain auxiliary metals not dissolving a certain mixed crystal or, by observing a certain law of heating the mixture or, by avoiding a certain excessive temperature, or by following two or more of these rules, any wanted composition of the finished body can be obtained.

There exist several ways of explaining the surprising result of the invention, although the inventor declines to limit the invention or to base it on any theory.

According to the theory applying to mixed crystals or solid solutions, as referred to above and in my copending applications, particularly my Patent 1,959,879, the hardness of mixed crystals or solid solutions exceeds that of either component substance, and consequently the hardness of solid solutions formed of three or more carbides exceeds that of either component carbide.

While in the above patent I have described a particular method of manufacturing hard metal tool alloys comprising three or more hard and refractory carbides, it should be understood that any other method as disclosed in my earlier applications may be applied.

Thus the three or more metals selected to form the desired carbide compounds, or even their oxides may be admixed with carbon in sufficient amount to form the desired carbide, and if oxides were introduced, to reduce the latter to their metallic state and thereafter carbidize them. The mixture preferably powdered as finely as possible is heated to sintering or melting temperature, and a hard composition obtained thereby in which the desired carbide compounds and homogeneous carbide crystal structures as defined above are present. The hard composition is then ground, if necessary, to desired particle size, admixed with powdery auxiliary metal, shaped and sintered preferably between 1330° to 1600° C. for e. g. one to four hours if metal of the iron group is used as auxiliary metal.

Moreover, the three or more metals, or even their oxides, selected to form the desired carbide compounds may be admixed, on one hand, with carbon in sufficient amount so as to carbidize the elements or oxides, and, on the other hand, with the selected auxiliary metal, and the mixture preferably powdered as finely as possible, heated to sintering temperature for a sufficient period of time so that a tough and hard composition results containing the desired compounds, including solid solutions or homogeneous carbide crystal structures as defined above, cemented by the auxiliary metal.

Furthermore, three or more selected carbides may be admixed with the selected auxiliary metal in as finely divided state as possible, and heated to sintering temperature for a sufficient period of time so that a cemented hard composition results, containing solid solutions or homogeneous carbide crystal structures as defined above, of the carbides in substantial amount. If metal of the iron group is used as auxiliary metal, heating to between about 1330° to 1600° C. for e. g. one to four hours is advisable.

However, any other method of manufacturing the hard and tough composition answering the invention may be used.

It is sometimes difficult to compound certain carbides in desired ratio to form a solid solution. Thus, it is sometimes difficult to incorporate the very important titanium carbide in the desired other hard carbide, in extraordinarily uniform distribution. By the addition of a third carbide, such as molybdenum carbide, even in small amounts as shown hereafter, such incorporation and distribution of all the constituent carbides and their mutual thorough permeation can readily and economically be secured.

It is not necessary, according to the invention, that the hard metal alloy contains solely at least ternary mixed crystals as far as the carbides present are concerned. It is satisfactory, however, for the invention if only substantial amounts of such mixed crystals are present. According to experience already about 10% of the hard metal alloy formed by at least ternary mixed crystals or homogeneous carbide crystal structures as defined above, are capable of considerably improving the properties of the hard metal. If about half of the carbides present or more are transformed into such ternary mixed crystals, a decisive improvement can be ascertained. Besides, auxiliary metal may be present in amounts of from about 3% to 25%. The amounts of ternary, quaternary, and so on, mixed crystals of carbide of elements taken from the third, fourth, fifth, and/or sixth group of the periodical system may conveniently amount to at least from about 35 to 45% of the alloy, up to about 75% to 95% of it, the remainder being formed by binary and/or simple carbide of the same or other elements taken from the same or other groups of the periodical system, and auxiliary metal preferably taken from the eighth group of the periodical system, and especially from the iron group, in amounts from about 3% to about 25% by weight of the alloy.

It is quite difficult to mention any minimum amounts of carbide to be present, because 5% titanium carbide occupy a space four times as large as 5% by weight of tungsten carbide. Nevertheless, the minimum amount of carbide to be present and forming part of a ternary, and so on, mixed crystal according to the invention, has to be substantial and, as a minimum, about 1% by weight of the alloy. In manufacturing the alloy, the carbides are to be chosen so that they readily form mixed crystal pairs (binary mixed crystals) and that further, the mixed crystals so obtained are capable of forming again mixed crystals, i. e. to permeate each other and to form a so-called solid solution. In the same way, the auxiliary metal is to be chosen so that the mixed crystals formed are not dissolved and separated again into their constituents or mixed crystal-constituents in any undesired and uncontrollable way.

Carbides usable for the invention are in the first place those of silicon, boron, titanium, zirconium, vanadium, tantalum, columbium, molybdenum, tungsten. But also elements of the eight group as chromium, cobalt, nickel, iron, may sometimes be chosen to form carbides to be combined with those of other elements to form mixed crystals. These carbides have in common the properties of being sufficiently hard and refractory, i. e. they do not decompose under the influence of water and/or air at elevated temperatures. Hard metals are used in the first place as tool implements for high speed work. Thereby the temperature of the hard metal and at least of its working edge is raised by several hundred centigrades and cooling water is to be applied. Therefore among all carbides of elements belonging to the third to sixth group of the periodical system only those are suitable and consequently to be chosen for the purposes of the invention which are refractory in the sense just defined and which is meant also by the use of the term refractory in the appended claims.

In practice for instance the following alloy has proven to be most advantageous: About 60% to 75% tungsten carbide, in the form of $W_2C$; about 10% to 25% titanium carbide; about 1% to 25% molybdenum carbide; about 5% to 25% cobalt, nickel and/or iron. In such a mixture titanium carbide may particularly be present in amounts of from about 12% to 15%, molybdenum carbide in amounts of from about 1% to 5%. In manufacturing the hard metal alloy, first two groups of mixed crystals are formed, one group consisting of molybdenum carbide and tungsten carbide, the other group of titanium carbide and tungsten carbide, whereupon these two groups are combined to a single group of substantially ternary mixed crystals, containing tungsten carbide, titanium carbide, and molybdenum carbide. The formation of mixed crystals may occur by heating the chosen amounts of the carbides up to from about 1600° to 2000° C., preferably in a neutral or carbon-containing atmosphere. In the same way the ternary (and so on) mixed crystals can be obtained by heating the previously obtained mixed crystals up to the same range of temperature, or a higher one, up to about 2600° C. The temperature to be applied depends on the melting temperature of the carbides themselves, on their mutual solubility, and on the time of heating. If applying the heat within a range of about 1600° to 2000° C., a heating of from 1 to 4 hours regularly suffices. The mixed crystals so obtained are then powdered and mixed with the auxiliary metal preferably powdered to about the same degree and then sintering has to be done within a range of temperature of above 1300° C. up to about 1400 to 1600° C.

While any man skilled in the art can proceed to practice the invention described, there may be given, nevertheless, a few further examples of making hard metal tool alloys according to the invention.

The special tool alloy described hereinbefore and containing tungsten carbide, titanium carbide, molybdenum carbide, and auxiliary metal taken from the eighth group of the periodical system, may be manufactured in about the following way: 5% by weight of $MO_2C$ and 4% by weight of TiC are powdered, intimately mixed, preferably in a ball mill, for about 20 to 30 hours, and then heated up to about 1600 to 2000° C. in a crucible and preferably by induction for about one to two hours, whereby mixed crystals of them are obtained. About 65% by weight of $W_2C$ and about 12% by weight of TiC are powdered preferably in a ball mill for about 20 to 36 hours and then heated in the same way, up to about 1600–2000° C. for one to four hours. Both kinds of mixed crystals so obtained are then intimately mixed again and powdered preferably in a ball mill by treating them for about 10 to 40 hours therein so that they are again as finely divided as possible, and heated again up to about 1600–2000° C. for about one to four hours. Thereby new mixed crystals are obtained comprising the two kinds of mixed crystals which have been intimately mixed together before. To this mixture is then added auxiliary metal in amounts of about 14%, consisting for instance of 13% nickel and 1% chromium. This material is once more intimately mixed preferably in a ball mill by treating it for about 4 to 24 hours therein, whereupon the powder so obtained may be pressed to a desired shape and heated up to about 1400–1600° C. for about 1 to 4 hours and cooled in any desired way, that is, rapidly or slowly, or first rapidly and then slowly, or first slowly and then rapidly.

This material will be suited to work steel, semi-steel, and cast iron in a very superior way.

Another composition may be obtained from two groups of mixed crystals, one group consisting of about 8% TiC and 35% TaC, the other group of 8% TiC and 35% $W_2C$, this group of mixed crystals being manufactured in an analogous way as described before in the body of the specification, whereupon the two groups are intimately mixed and again heated up to about 1600 to 2000° C. or more, whereby new mixed crystals of them are obtained. After adding auxiliary metal, the mixture may be shaped and sintered.

Also a group of mixed crystals may be formed, however, consisting of about 8% TiC and 10% $MO_2C$, and another group consisting of 60% $W_2C$ and 15% $MO_2C$, whereupon these two groups are combined to form ternary mixed crystals, to which are then added about 7% cobalt as auxiliary metal. This mixture is then shaped and sintered.

Apparently, in the three examples the binary mixed crystals pertaining to the two groups to be combined subsequently, present a hardness which is higher than that of the single carbides constituting the respective mixed crystals, because the amounts of the carbides to be combined in a mixed crystal are chosen accordingly. If two of such mixed crystals are combined to a single new one, its hardness will surpass that of the constituent binary mixed crystal.

It must be understood that the invention is not limited to any examples given hereinbefore but to be derived in its broadest aspect from the appended claims.

What I claim is:

1. A cemented hard metal composition sintered by heat treatment, consisting substantially of auxiliary metal essentially of the eighth group of the periodical system in an amount of about 3% to 25% by weight, and a hard and refractory crystalline carbide substance of at least three elements selected from the third through sixth group of the periodical system, a substantial amount of said carbide substance forming homogeneous carbide crystal structures each containing atoms of different selected elements from said groups in addition to carbon atoms.

2. A cemented hard metal composition, for tool elements and other working appliances, consisting of at least three different hard and refractory carbides of elements selected from the third, fourth, fifth and sixth group of the periodical system and auxiliary metal substantially of the eighth group of the periodical system in amounts of about 3% to about 25% by weight, substantial amounts of said carbides forming solid solutions.

3. In a hard metal as being claimed in claim 1, the carbide substance present amounting from about 75% to 95% by weight of the final body and forming homogeneous carbide crystal structures amounting from about 35% up to 75% and 95%.

4. A hard metal as being claimed in claim 1, the auxiliary metal being chosen from the eighth and sixth group of the periodical system.

5. A hard metal as claimed in claim 1, containing carbide of at least one element of the eighth group in substantial amount besides hard and refractory carbide substance of elements of the third to sixth group of the periodical system.

6. A hard metal as claimed in claim 1, containing carbide of at least one element of the eighth group in amount from about 1% to 5% besides hard and refractory carbide substance of elements of the third to sixth group of the periodical system.

7. A hard metal composition as claimed in claim 2, the auxiliary metal being chosen from the eighth and sixth group of the periodical system.

8. A cemented hard metal composition sintered by heat treatment, for tool elements and other working appliances, consisting substantially of at least three different hard and refractory carbides of elements selected from the third through sixth group of the periodical system and auxiliary metal substantially of the eighth group of the periodical system in amounts of about 3% to about 25% by weight, the minimum amount of a selected carbide to be about one percent, said carbides heat treated to form in substantial amount homogeneous carbide crystal structures containing atoms of different selected elements from said groups in addition to carbon atoms and thereby to increase the average hardness of the carbide substance contained in the composition.

9. A cemented hard metal composition sintered by heat treatment, for tool elements and other working appliances, consisting substantially of at least three different hard and refractory carbides of elements selected from the third through sixth group of the periodical system and auxiliary metal substantially of the eighth group of the periodical system in amounts of about 3% to 25% by weight, a minimum amount of a selected carbide to be about one percent, said carbides present in finely divided state and heat treated to form in substantial amount homogeneous carbide crystal structures containing atoms of different selected elements of said groups in addition to carbon atoms and thereby to increase the average hardness of the carbide substance contained in the composition.

10. A cemented hard metal composition sintered by heat treatment, for tool elements and other working appliances, consisting substantially of at least three hard and refractory carbides of different elements selected from the third through sixth group of the periodical system and auxiliary metal substantially of the iron group in amounts of about 3% to about 25% by weight, the minimum amount of a selected carbide to be about one percent, said carbides being present in as finely divided a state as possible and heat treated to form solid solutions in substantial amount and thereby to increase the average hardness of the carbide substance contained in the composition.

11. A cemented hard metal composition sintered by heat treatment, for tool elements and other working appliances, consisting substantially of carbide substance and auxiliary metal substantially of the iron group in amounts of about 3% to about 25% by weight, said carbide substance consisting of at least three carbides selected from a group of carbides of the elements molybdenum, tungsten, titanium, tantalum, vanadium, columbium, the minimum amount of a selected carbide to be about one percent, said carbides heat treated to form in substantial amount homogeneous carbide crystal structures containing atoms of different elements from said groups in addition to carbon atoms and thereby to increase the average hardness of said carbide substance.

12. A sintered hard metal composition for tool elements and other working appliances, substantially consisting of at least three different carbides selected from a group of carbides of the elements molybdenum, tungsten, titanium, tantalum, boron, vanadium, columbium, and auxiliary metal substantially of the eighth group of the periodical system in amounts of about 3% to about 25% by weight, the minimum amount of a selected carbide to be about one percent, and substantial amounts of said carbides forming homogeneous carbide crystal structures containing atoms of different elements from said groups in addition to carbon atoms.

13. A sintered hard metal composition, for tool elements and other working appliances, consisting substantially of carbides of the elements titanium, tantalum, tungsten, and auxiliary metal substantially of the iron group in amounts of about 3% to about 25% by weight, the minimum amount of a selected carbide to be about one percent, and substantial amounts of said carbides forming homogeneous carbide crystal structures containing atoms of different ones of said elements in addition to carbon atoms.

14. A sintered hard metal composition, for tool elements and other working appliances, consisting substantially of carbides of the elements molybdenum, tantalum, titanium, and auxiliary metal substantially of the iron group in amounts of about 3% to about 25% by weight, the minimum amount of a selected carbide to be about one percent, and substantial amounts of said carbides forming homogeneous carbide crystal structures containing atoms of different ones of said elements in addition to carbon atoms.

15. In a method of producing a hard metal for tool elements and other working appliances containing at least three hard and refractory carbides of elements selected from the third, fourth, fifth, and sixth group of the periodical system, and auxiliary metal substantially of the eighth group of the periodical system in amounts from about 3% to 25%, transforming substantial amounts of said carbides into at least two groups of mixed crystals, each group containing different carbides, mixing substantial amounts of mixed crystals of said groups and forming from this mixture newly combined mixed crystals, and consolidating the mass so obtained with the auxiliary metal by treatment at elevated temperatures up to about 1400° to 1600° C.

16. In a method of producing a hard metal for tool elements and other working appliances containing at least three hard and refractory carbides of elements selected from the third, fourth, fifth, and sixth group of the periodical system, and auxiliary metal substantially of the eighth group of the periodical system in amounts from about 3% to 25%, transforming by heat treatment at above about 1600° C. substantial amounts of said carbides into at least two groups of mixed crystals, each group containing different carbides, mixing substantial amounts of mixed crystals of said groups and forming from this mixture newly combined mixed crystals by heat treatment at above about 1600° C., and consolidating the mass so obtained with the auxiliary metal by treatment at elevated temperatures up to about 1400° to 1600° C.

17. In a method of producing hard metal for tool elements and other working appliances containing at least three hard and refractory carbides of elements selected from the third, fourth, fifth and sixth group of the periodical system and auxiliary metal substantially of the eighth group of the periodical system in amounts from about 3% to 25%, transforming substantial amounts of said carbides into at least two groups of mixed crystals, each group containing different carbides, mixing substantial amounts of mixed crystals of said groups and forming from this mixture newly combined mixed crystals, adding thereto a substantial amount of at least one of said carbides and auxiliary metal, and consolidating the mass so obtained by treatment at elevated temperatures up to about 1400° to 1600° C.

18. In a method of producing hard metal for tool elements and other working appliances containing at least three hard and refractory carbides of elements selected from the third, fourth, fifth and sixth group of the periodical system and auxiliary metal substantially of the eighth group of the periodical system in amounts from about 3% to 25%, transforming substantial amounts of said carbides into at least two groups of mixed crystals, each group containing different carbides, mixing substantial amounts of mixed crystals of said groups and forming from this mixture newly combined mixed crystals by heat treatment at above about 1600° C., adding thereto a substantial amount of at least one of said carbides and auxiliary metal, and consolidating the mass so obtained by treatment at elevated temperatures up to about 1400° to 1600° C.

PAUL SCHWARZKOPF.